(12) United States Patent
Chen

(10) Patent No.: US 6,564,275 B1
(45) Date of Patent: May 13, 2003

(54) ELECTRONIC SWITCHING DEVICE FOR A UNIVERSAL SERIAL BUS INTERFACE

(75) Inventor: Sun Chung Chen, Taipei (TW)

(73) Assignee: Aten International Co., Ltd., Taipei (TW)

( * ) Notice: Subject to any disclaimer, the term of this patent is extended or adjusted under 35 U.S.C. 154(b) by 0 days.

(21) Appl. No.: 09/514,579

(22) Filed: Feb. 28, 2000

(30) Foreign Application Priority Data

May 28, 1999 (TW) .......................................... 88208630 U

(51) Int. Cl.[7] .............................................. G06F 13/36
(52) U.S. Cl. ............................... 710/107; 710/5; 710/8; 710/20; 710/33; 710/36; 710/51; 710/62; 710/63; 710/107; 710/305; 710/313
(58) Field of Search ........................... 710/5, 8, 20, 33, 710/36, 51, 62, 63, 107, 305, 313

(56) References Cited

U.S. PATENT DOCUMENTS

| | | | |
|---|---|---|---|
| 6,012,103 A | * | 1/2000 | Sartore et al. .................. 710/8 |
| 6,057,674 A | * | 5/2000 | Bangerter .................... 323/211 |
| 6,073,188 A | * | 6/2000 | Fleming ....................... 710/38 |
| 6,118,496 A | * | 9/2000 | Ho .............................. 348/706 |

* cited by examiner

Primary Examiner—Jeffrey Gaffin
Assistant Examiner—Mohammad O. Farooq
(74) Attorney, Agent, or Firm—Bacon & Thomas, PLLC

(57) ABSTRACT

The present invention provides an electronic switching device for a universal serial bus (USB) interface, which can connect several different electronic devices each having a universal serial bus (USB) interface when needed. By manually enabling a switch of the electronic switching device for a universal serial bus (USB) interface, a trigger signal generated from a trigger signal generator will be outputted to a control signal generator to generate a control signal for connecting related electronic devices. A delay signal generator can be added to avoid the intermediate devices being operated unintentionally.

12 Claims, 10 Drawing Sheets

ELECTRONIC SWITCHING DEVICE FOR A UNIVERSAL SERIAL BUS INTERFACE

FIELD OF THE INVENTION

The present invention relates to a switching device for a universal serial bus interface, and more particularly to an electronic switching device that can connect a plurality of device each having a universal serial bus interface, so as to share related resources.

BACKGROUND OF THE INVENTION

All of the conventional switching devices for a universal serial bus (USB) interface are mechanical switching devices. The switching action of the mechanical switching device is a kind of sequential switching, therefore, when the switch passes the intermediate unrelated connection points, the related electronic signal will cause unrelated devices to operate, even though the connection time is very short. When the switching between related devices is very fast, the related devices may not operate accurately.

Furthermore, a mechanical switching device is apt to form the disconnection problem, and sometimes is not very easy to twist/turn.

OBJECTS OF THE INVENTION

It is therefore an object of the present invention to provide an electronic switching device for a universal serial bus interface, such that when enabling the switch sequentially to select a related device, due to a delay signal generator design the intermediate devices will not operate.

It is another object of the present invention to provide an electronic switching device for a universal serial bus interface, so as to replace the conventional mechanical switching device to avoid the disconnection problem, and the twist/turn problem.

BRIEF DESCRIPTION OF THE DRAWINGS

The present invention can be better understood with the following drawings, in which.

DETAILED DESCRIPTION OF THE INVENTION

Figure 1:
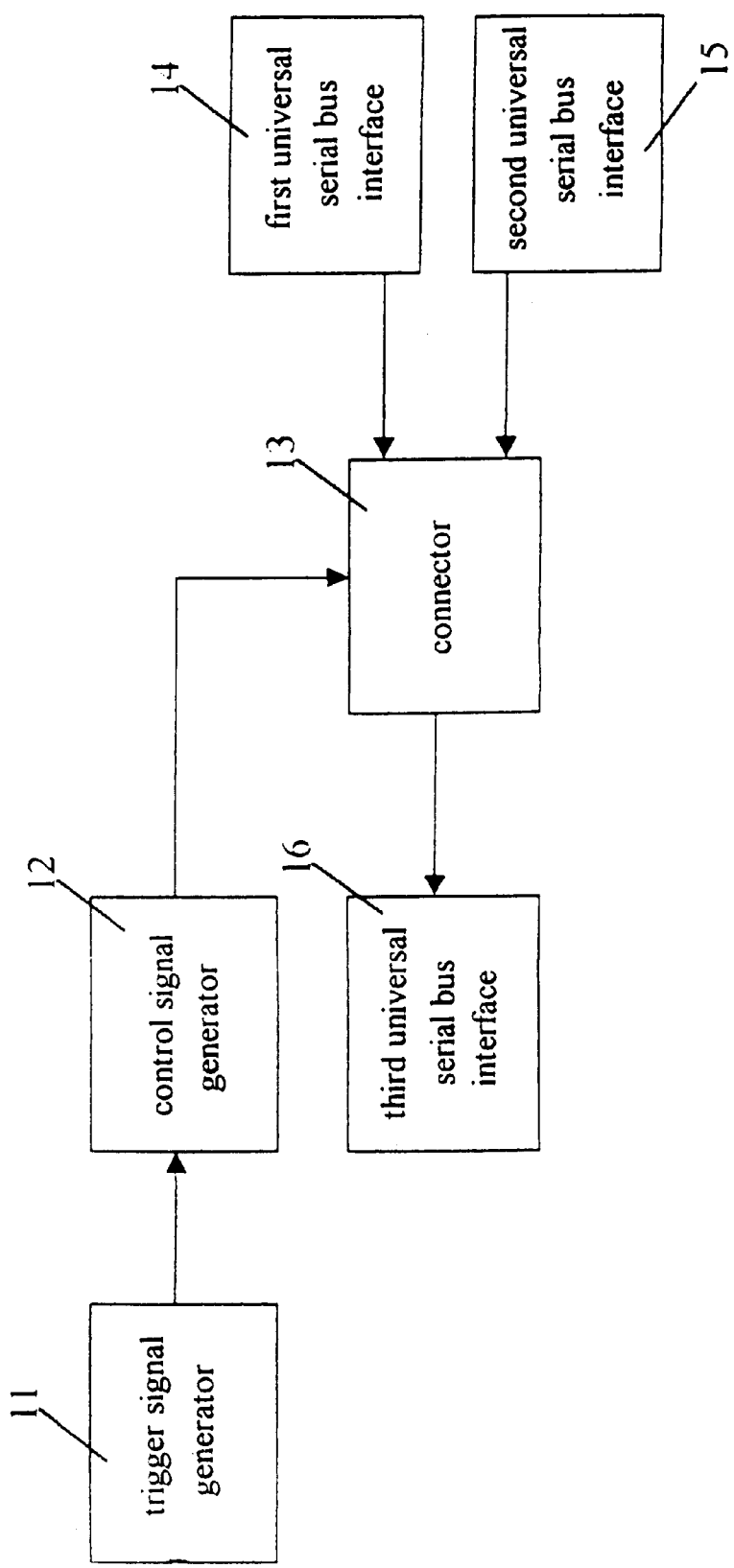
FIG. 1 is a schematic block diagram according to a first embodiment of the present invention.

Referring to FIG. 1, which is a schematic block diagram according to a first embodiment of the present invention. As shown in the figure, a trigger signal generator 11, a control signal generator 12, and a connector 13 are included, in which:

the trigger signal generator 11 having an output to be connected with an input of the control signal generator 12, and having a switch SW1 (please see FIG. 2) to output a trigger signal to control signal generator 12 when a user pushes the switch SW1 down;

the control signal generator 12 having an input to be connected with an output of the trigger signal generator 11, and having an ouput to be connected with an input of the connector 13, for receiving the trigger signal outputted from the trigger signal generator 11, and processing the trigger signal, then outputting a control signal to the connector 13;

the connector 13 having an input to be connected with a first universal serial bus (USB) interface 14 and a second universal serial bus (USB) interface 15, and having an output to be connected with a third universal serial bus (USB) interface 16. When the connector 13 receives the control signal outputted from the the control signal generator 12, the connector 13 will connect the third USB interface 16 with the first USB interface 14 or the second USB interface 15.

Figure 2:
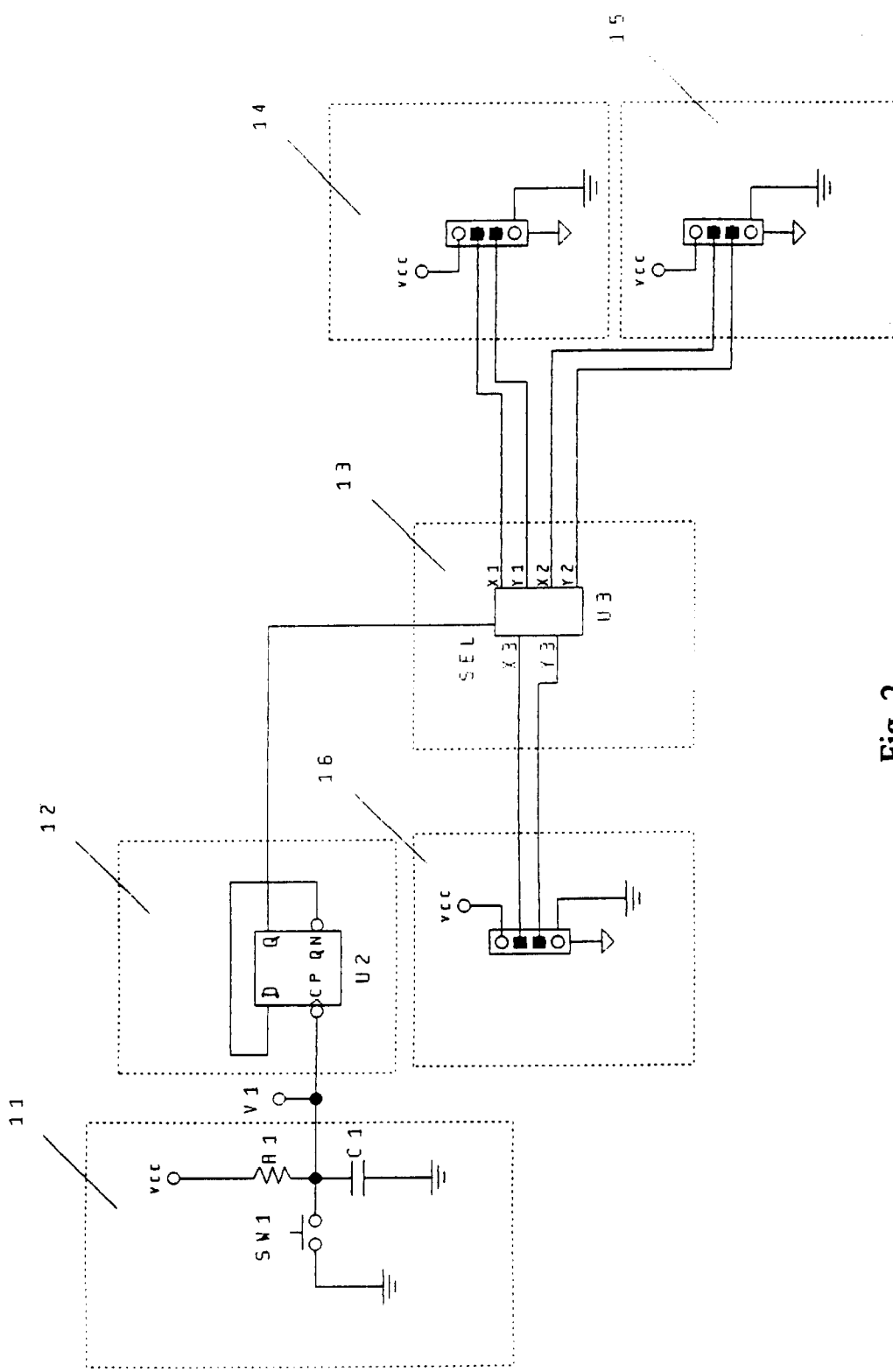
FIG. 2 is the circuit diagram of the first embodiment of the present invention.

Next referring to FIG. 2, a detailed circuit of the first embodiment according to the present invention will be described. A trigger signal generator 11, a control signal generator 12, and a connector 13 are included, in which:

the trigger signal generator 11 comprising a resistor R1, a capacitor C1, and a switch SW1. The resistor R1 and the capacitor C1 are serially connected between VCC and ground (GND). One end of the resistor R1 is connected with VCC, the other end of the resistor R1 is connected with one end of the capacitor C1, the other end of the capacitor C1 is connected with GND. One end of the switch SW1 is connected to GND, the other end of the switch SW1 is connected to where the resistor R1 is connected with the capacitor C1, having a voltage V1. Before the switch SW1 is enabled, the switch SW1 does not conduct, and voltage V1 will be maintained at a HIGH voltage; when the switch SW1 is enabled, it will conduct, voltage V1 will be connected to GND, so as to change the HIGH voltage to LOW voltage. When SW1 is opened again, voltage V1 will return to HIGH voltage due to the charging of the capacitor C1. Therefore, open/short actions of SW1 will cause the capacitor C1 charging/discharging, and make the voltage V1 HIGH/LOW so as to generate a pulse signal to be used as a trigger signal to control the control signal generator 12;

the control signal generator 12 comprising a first D FLIP-FLOP (or an equivalent circuit) U2. The clock signal input terminal CP of the first D FLIP-FLOP U2 is connected with the output of the trigger signal generator 11, while the reverse data output terminal QN is connected with the data input terminal D, and the output signal from the positive data output terminal Q is used as the control signal of the connector 13. When the clock signal input terminal CP receives a pulse signal, the voltage of terminal D will be moved to terminal Q, while a reverse voltage of the original voltage of the terminal D will be formed at terminal QN, and the voltage of the terminal QN will then be sent back to terminal D. When the terminal CP receives the next pulse signal, the first D FLIP-FLOP U2 will repeat the above procedures. Therefore, when the terminal CP receives pulse signals continuously, the HIGH voltage and the LOW voltage will be outputted alternately, and used as the control signals for the connector 13;

the connector 13 comprising a first multiplexor U3 (or an equivalent circuit), the first set of signal input terminal X1 and Y1 is connected with the first USB interface 14, the second set of signal input terminal X2 and Y2 is connected with the second USB interface 15, the third set of signal input terminal X3 and Y3 is connected with the third USB interface 16, while a selecting signal input terminal SEL is connected with the output of the control signal generator 12, and the alternating signals outputted from the control signal generator 12 are used as the selecting signal of the first multiplexor U3. When a LOW voltage signal is inputted into the selecting signal input terminal SEL, the inputted signals to the first set of signal input terminal X1 and Y1 are outputted from the signal output terminal X3 and Y3. When a HIGH voltage signal is inputted into the selecting signal input terminal SEL, the inputted signals to the second set of signal input terminal X2 and Y2 are outputted from the signal output terminal X3 and Y3. In other words, the LOW voltage and the HIGH voltage of the selecting signal input terminal SEL will make the first USB interface 14 and the second USB interface 15 to be connected with the third USB interface 16 respectively.

Figure 3:
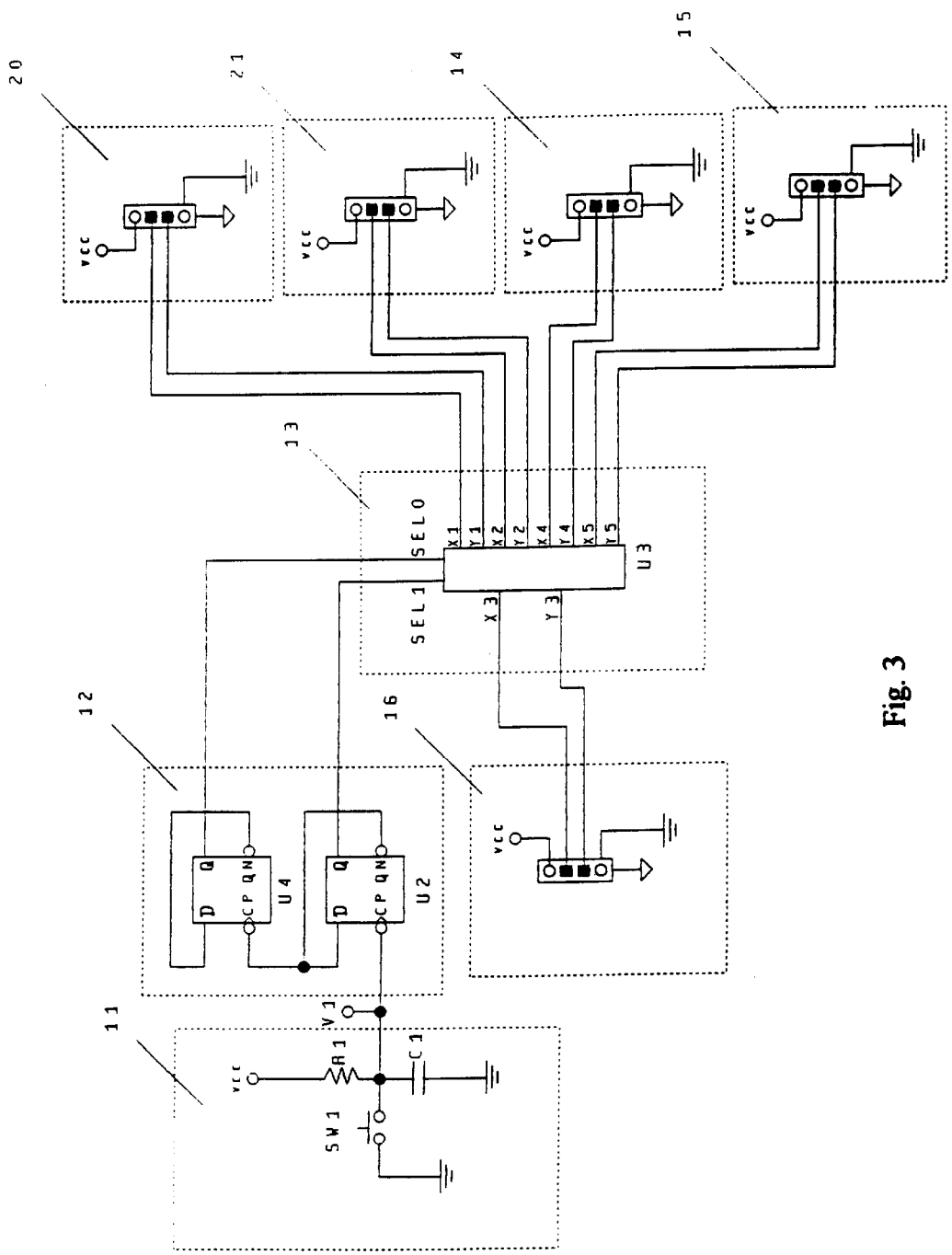
FIG. 3 is the circuit diagram of a second embodiment according to the present invention.

Referring to FIG. 3, which is the circuit diagram of a second embodiment according to the present invention. As shown in the figure, wherein the control signal generator 12 comprises two D FLIP-FLOPs (or equivalent circuits). The clock signal input terminal CP of the first D FLIP-FLOP U2 is connected with the output of the trigger signal generator 11, while the reverse data output terminal QN is connected with its data input terminal D. The clock signal input terminal CP of the second D FLIP-FLOP U4 is connected with the reverse data output terminal QN of the first D FLIP-FLOP U2, while the reverse data output terminal QN of the second D FLI P-FLOP U4 is connected with its data input terminal D, and the positive data output terminals Q of the first D FLIP-FLOP U2 and the second D FLIP-FLOP U4 are used as the control signals for the connector 13. When the clock signal input terminal CP of the first D FLIP-FLOP U2 receives a pulse signal, the voltage of its data input terminal D will be moved the positive data output terminal Q, while a reverse voltage of the original data input terminal D will be formed at the reverse data output terminal QN, and the voltage of the reverse data output terminal QN will then be sent back to the data input terminal D. When the next pulse signal is inputted to the control signal generator 12, the voltage of the data input terminal D will be moved to the positive data output terminal Q of the first D FLIP-FLOP U2, and now the voltage of the positive data output terminal Q is opposite to the voltage generated by the previous pulse signal inputted to the control signal generator 12. Thus a HIGH voltage and a LOW voltage wi be generated alternately. The voltage of the reverse data output terminal QN of the first D FLIP-FLOP U2 is used as a trigger signal to be inputted to the clock signal output terminal CP of the second D FLIP-FLOP U4, thus the positive data output terminal Q of the second D FLIP-FLOP U4 also generates HIGH and LOW voltages alternately, having a frequency just a half of the first D FLIP-FLOP U2's. Therefore, four patterns of LOW and LOW voltages, HIGH and LOW voltages, LOW and HIGH voltages, HIGH and HIGH voltages are obtained at the positive data output terminals Q of the first D FLIP-FLOP U2 and the second D FLIP-FLOP U4, and are outputted alternately as the control signals to let the connector 13 connect different USB interfaces.

Figure 4:
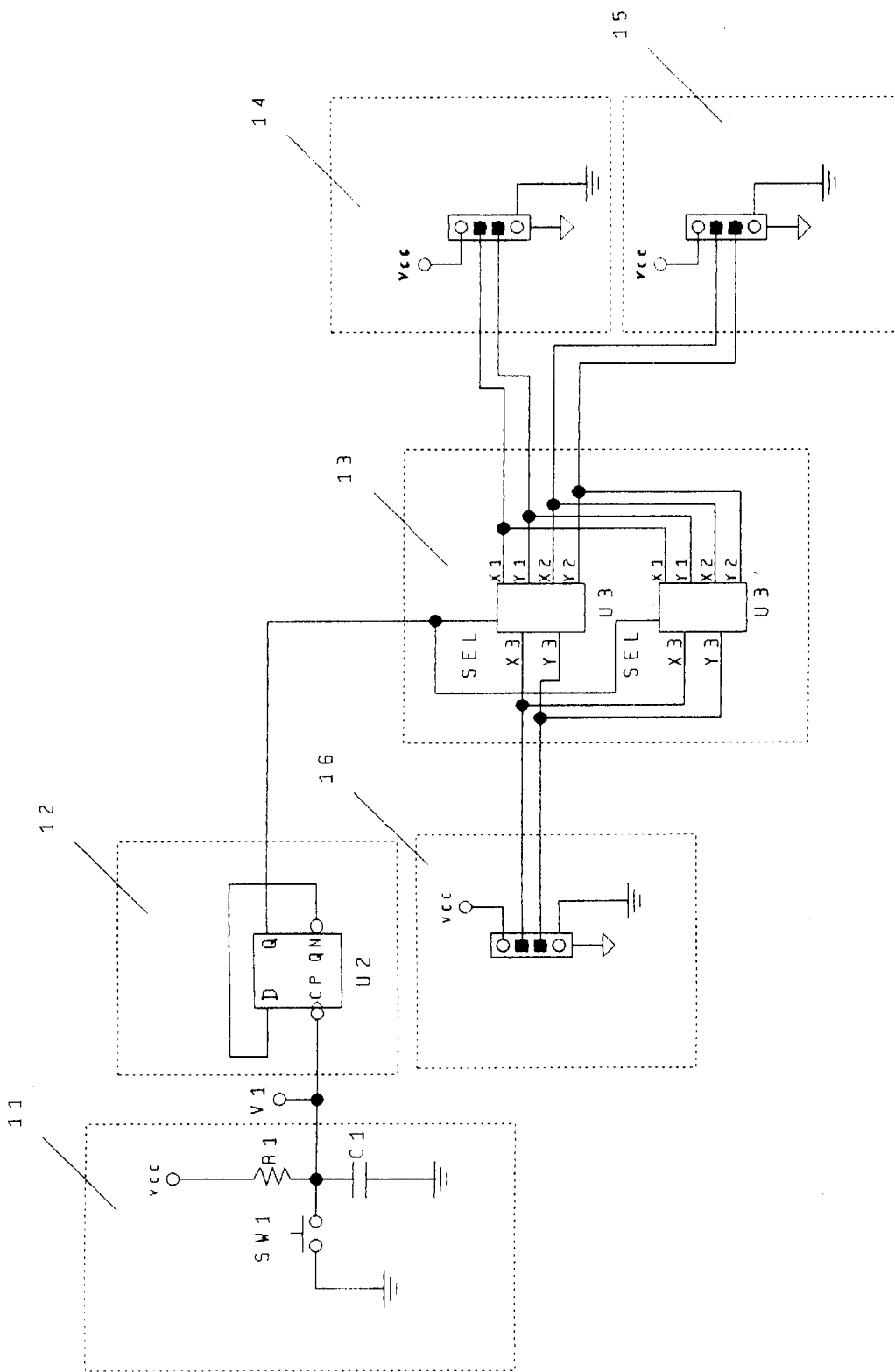
FIG. 4 is the circuit diagram of a third embodiment according to the present invention.

Referring to FIG. 4, which is the circuit diagram of a third embodiment according to the present invention. The difference between the circuit in FIG. 4 and the aforementioned electronic switching device for USB interface is the internal resistance in the connector 13. As shown in the figure, a first multiplexor U3 and a second multuplexor U3' are parallelly connected in the connector 13, so as to decerase the internal resistance in connector 13, therefore, the quality of the signal transmmision between USB interfaces are enhanced, and the distance between USB interfaces can be increased.

Figure 5:
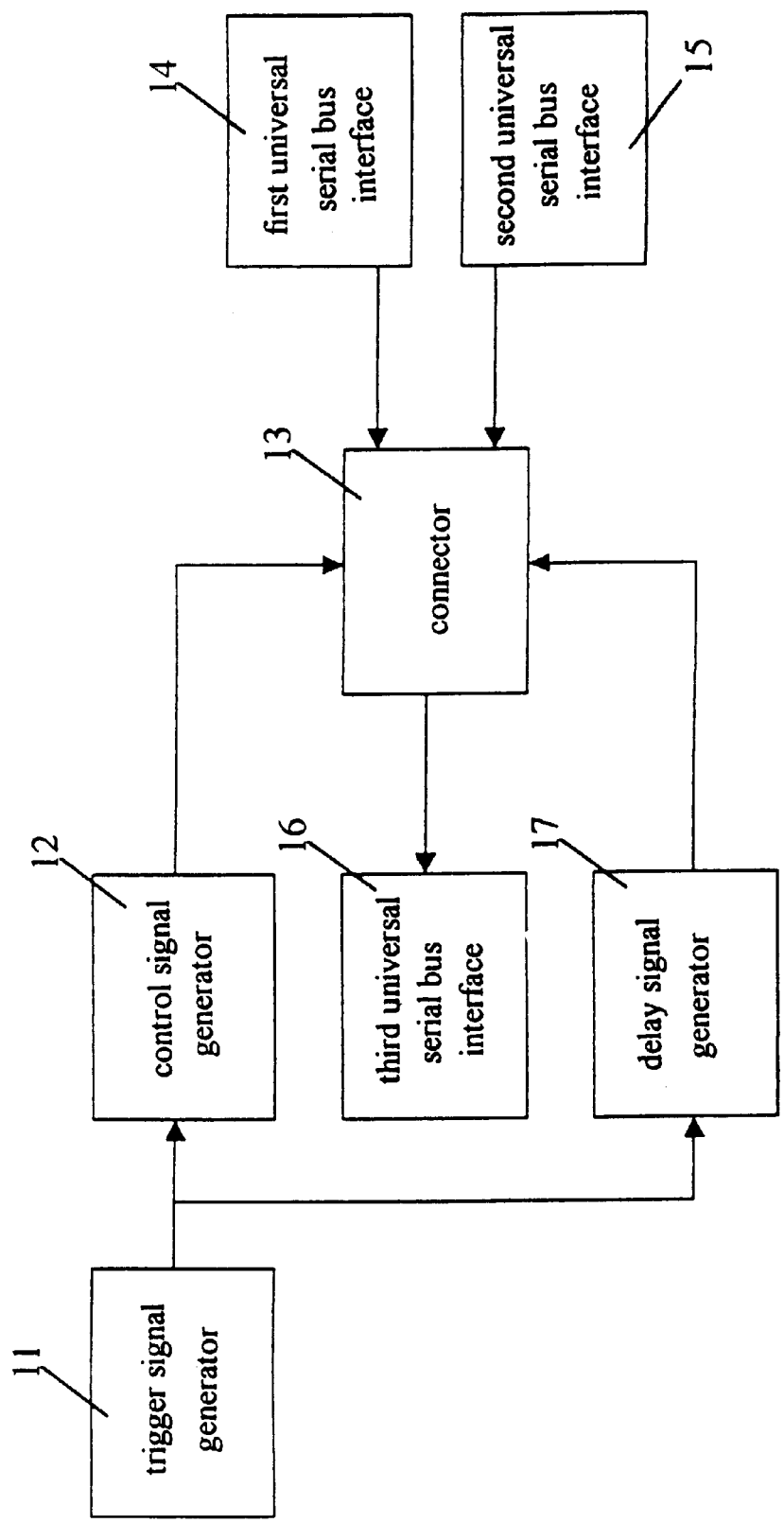
FIG. 5 is a schematic block diagram of the first embodiment of the present invention showing that a delay signal generator is added.
Figure 6:
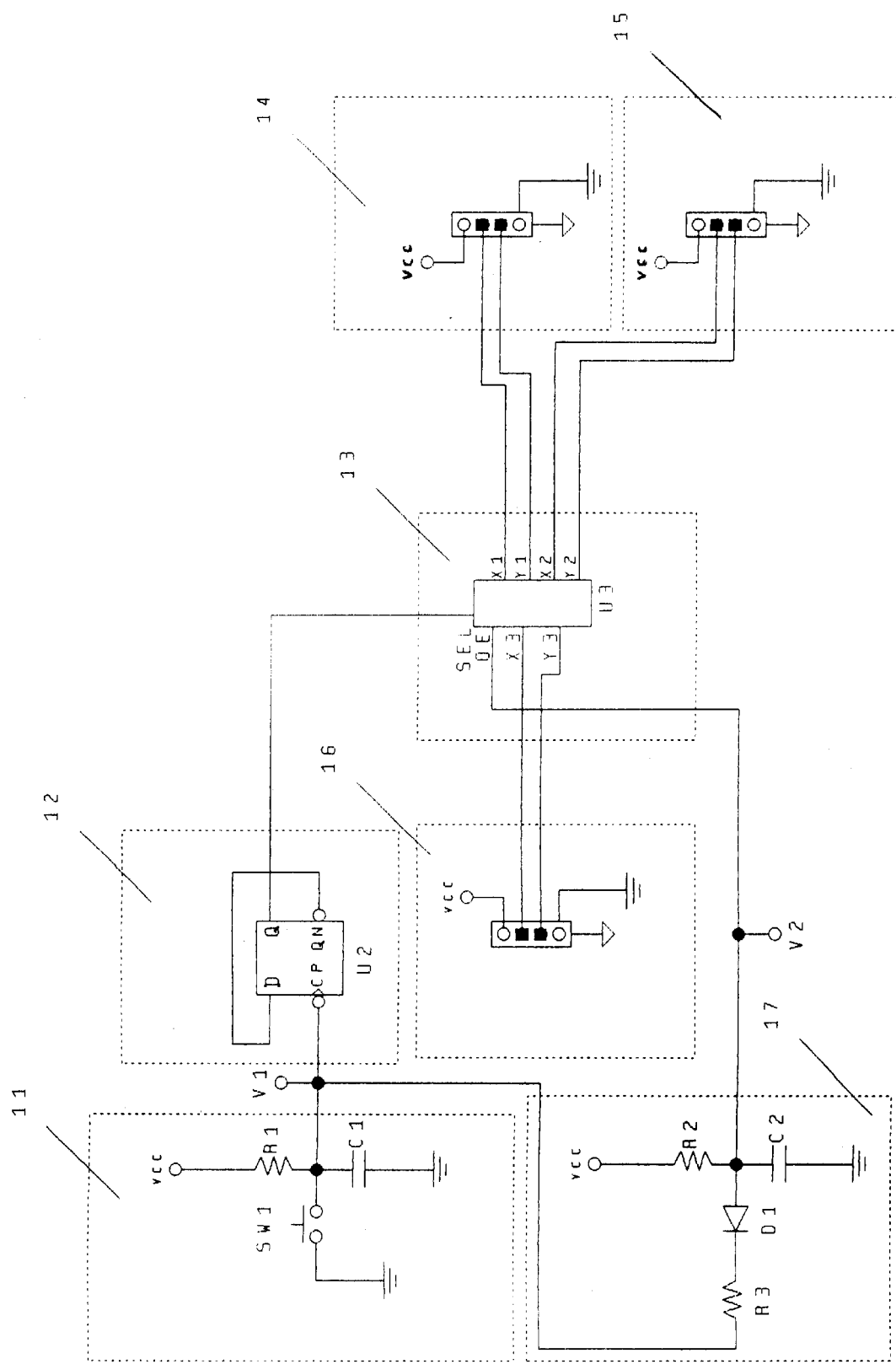
FIG. 6 is a schematic circuit diagram of the first embodiment of the present invention showing that a delay signal generator is added.

Referring to FIGS. 5 and 6, which are the schematic block diagram and the circuit diagram of the first embodiment of the present invention showing that a delay signal generator 17 is added. As shown in the figures, the delay signal generator 17 comprises a resistor R2, a capacitor C2 and a diode D1 (see FIG. 6), having its input to be connected with the output of the trigger signal generator 11, and its output to be connected with the enable terminal OE of the connector 13. The resistor R2 and the capacitor C2 are serially connected between VCC and GND, one end of the resistor R2 is connected with VCC, while the other end thereof is connected with one end of the capacitor C2, having a voltage V2, the other end of the capacitor C2 is connected to GND, the positive terminal of the diode D1 is connected with the voltage V2, while the negative terminal thereof is connected with one end of the resistor R3, the other end of the resistor R3 is the input terminal for the delay signal generator 17, and V1 (the output of the trigger signal generator 11) is used as the input of the delay signal generator 17, V2 is the output of the delay signal generator 17.

When the switch SW1 of the trigger signal generator 11 is conducting, the voltage V1 will be changed from HIGH voltage to LOW voltage, so the voltage V2 will also be changed from HIGH voltage to LOW voltage. When the switch SW1 of the trigger signal generator 11 is opened, the voltage V1 will be changed from LOW voltage to HIGH voltage, so the voltage V2 will also be changed from LOW voltage to HIGH voltage. In order to delay the time of V2 from LOW voltage to HIGH voltage, the present invention selects a capacitor having a longer time constant as the second capacitor C2. When the switch SW1 of the trigger signal generator 11 is conducting, the enable terminal OE of the connector 13 will be LOW voltage, thus the USB interfaces are all disconnected. After a while, the voltage V2 will be changed from LOW voltage to HIGH voltage, and the related USB interfaces are connected according to the control signals outputted from the control signal generator 12. The design of the present invention is to let the user turn the switch sequentially to select the required USB interface connection (e.g. push the switch button once to select the first device, and push the switch button twice to select the second device). However, if a user pushes the switch several times quickly, the unrelated intermediate USB interfaces might be conducting to cause signal confusing and disable the whole system, therefore, a delay signal generator 17 is needed to avoid unrelated device to react due to the delay saturation of the voltage V2.

Figure 7:
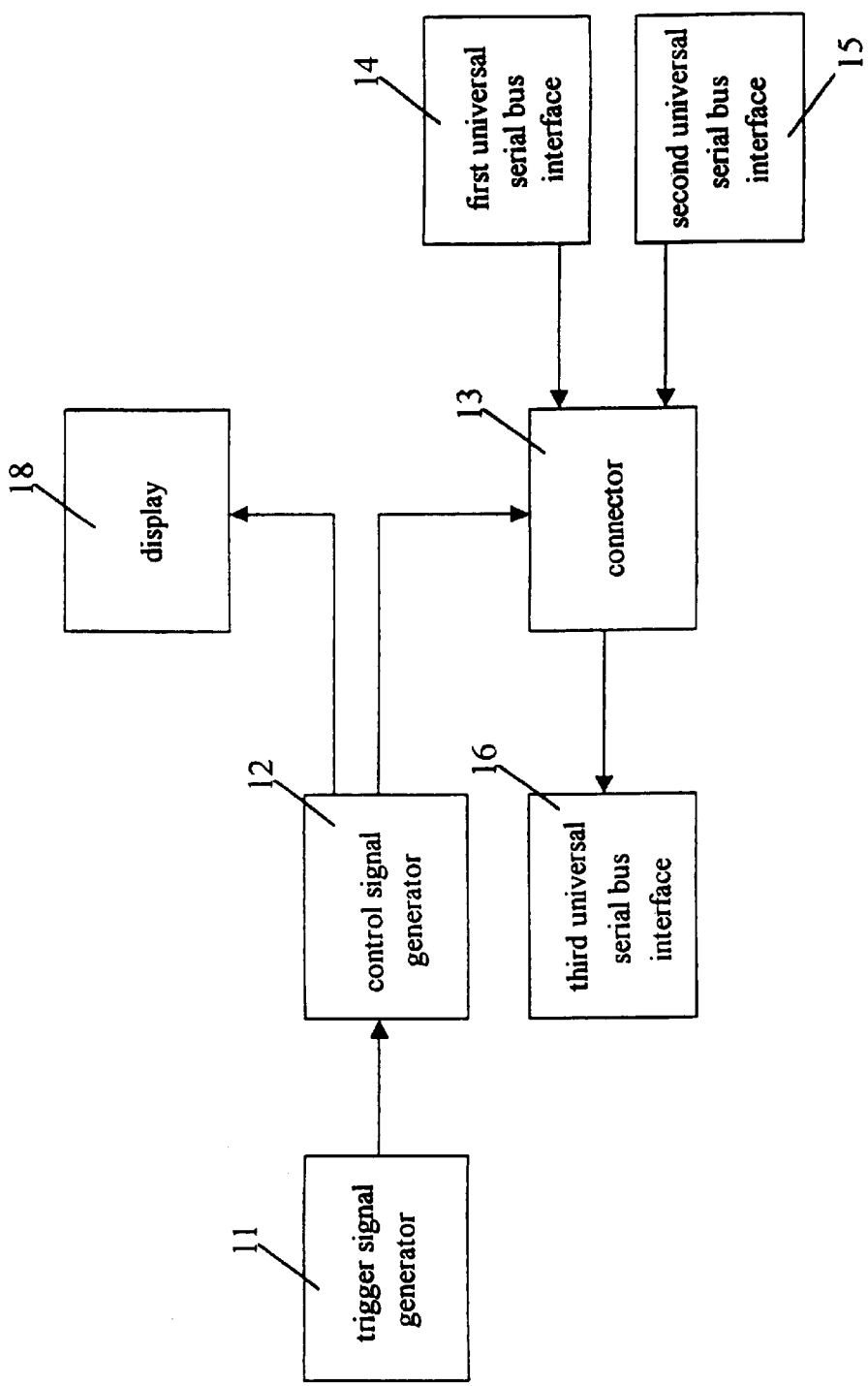
FIG. 7 is a schematic block diagram of the first embodiment of the present invention showing that a display is added.
Figure 8:
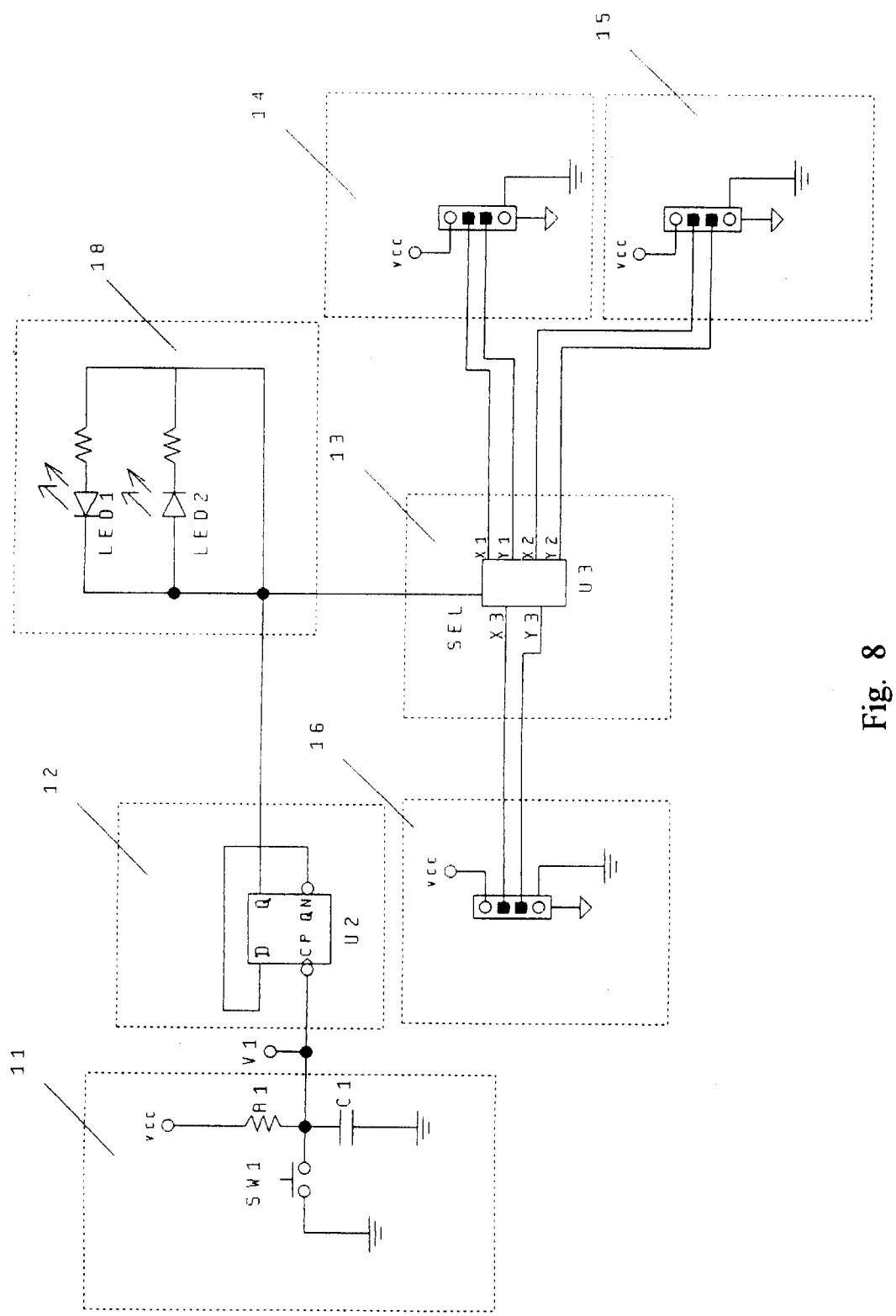
FIG. 8 is a schematic circuit diagram of the first embodiment of the present invention showing that a display is added.

Referring to FIGS. 7 and 8, which are the schematic circuit block diagram and the circuit diagram of the first embodiment of the present invention showing that a display 18 is added. As shown in the figures, the input of the display 18 is connected with the output of the control signal generator 12, the different signals outputted from the control signal generator 12 will make LED 1, LED 2 conducting respectively, so as to show the connections between different USB interfaces.

Figure 9:
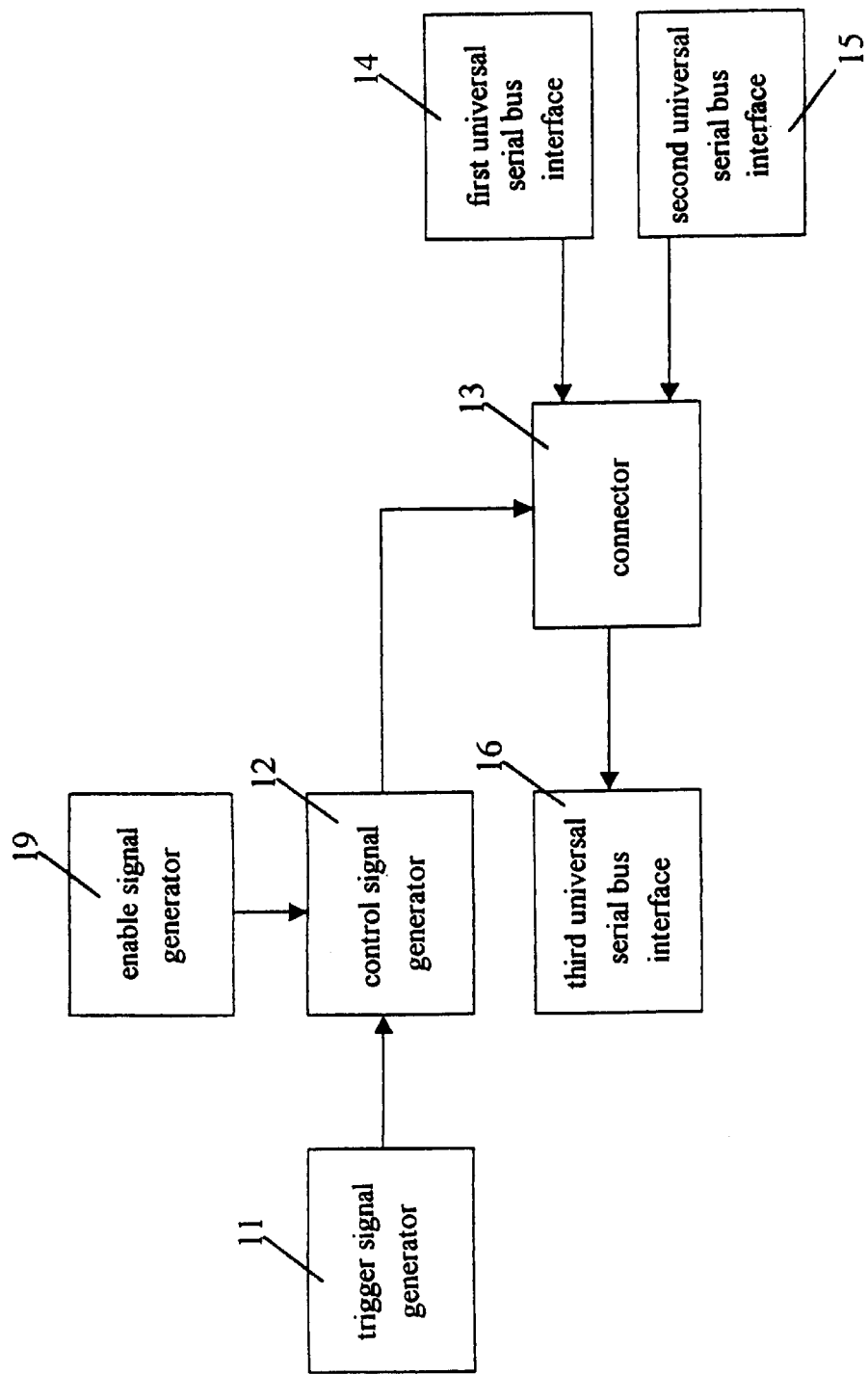
FIG. 9 is a schematic block diagram of the first embodiment of the present invention showing that an enable signal generator is added.
Figure 10:
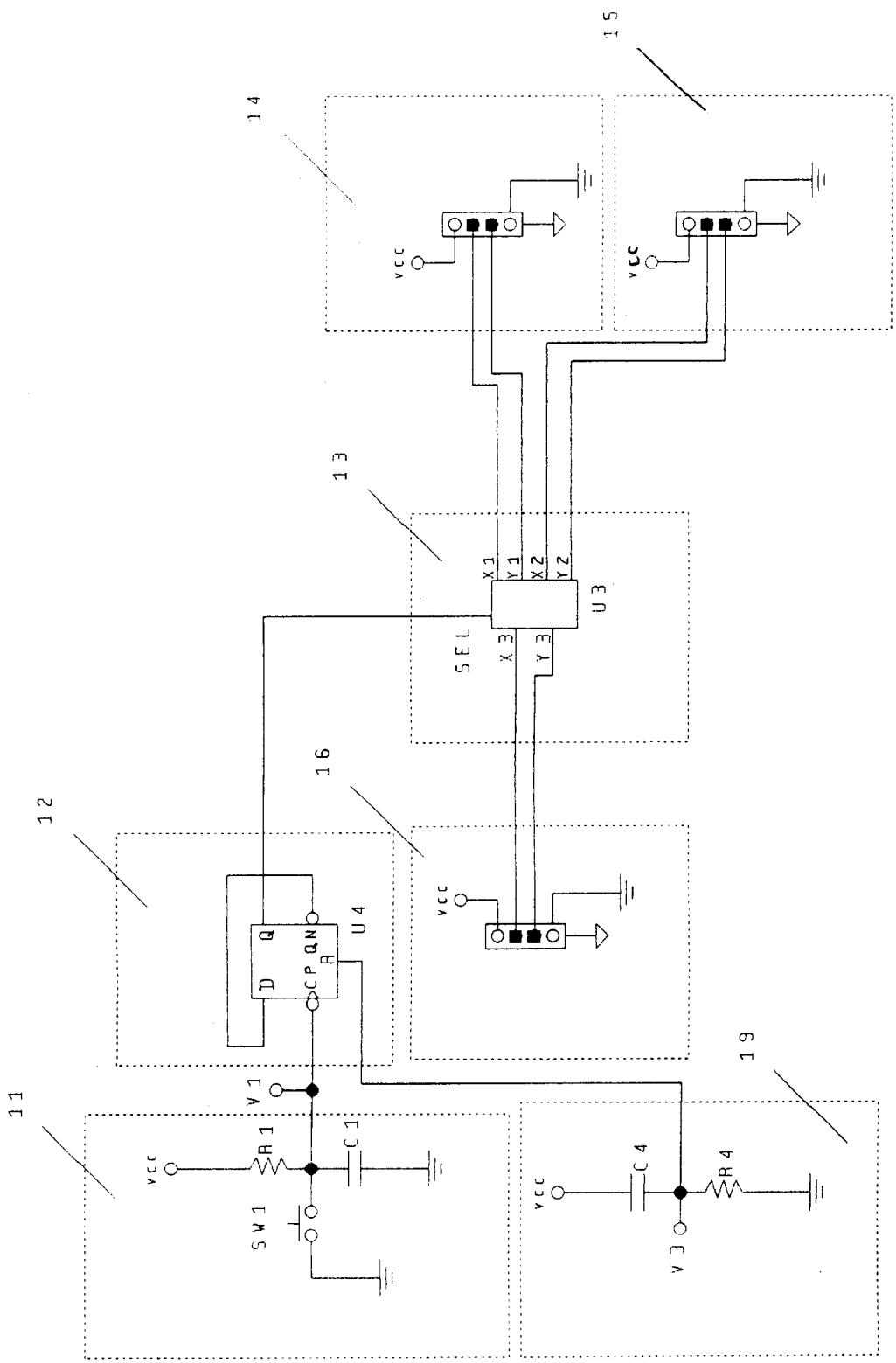
FIG. 10 is a schematic circuit diagram of the first embodiment of the present invention showing that an enable signal generator is added.

Referring to FIGS. 9 and 10, which are the schematic circuit block diagram and the circuit diagram of the first embodiment of the present invention showing that an enable signal generator 19 is added. As shown in the figure, the output of the enable signal generator 19 is connected with the control signal generator 12. The enable signal generator comprises a resistor R4 and a capacitor C4, wherein the resistor R4 and the capacitor C4 are serially connected between VCC and GND. One end of the resistor R4 is connected to GND, while the other end thereof is connected with one end of the capacitor C4, having a voltage V3. The other end of the capacitor C4 is connected with VCC. When VCC is conducting, V3 will be changed from LOW voltage to HIGH voltage immediately, and sent to the reset terminal R of the first D FLIP FLOP U2 of the control signal generator 12 to clear the output of the first D FLIP FLOP U2 to LOW voltage. After a while, since the capacitor C4 is charged, V3 will be changed from HIGH voltage to LOW voltage, and maintained at LOW voltage, and the control signal generator 12 will not be influenced by the enable signal generator 19. Thus the connections between different USB interfaces are the same whenever the VCC begins conducting.

Furthermore, VCC will be used as the HIGH voltage of the present invention, no other power supply is needed, and a diode can be connected between VCC and each USB interface to avoid the reverse current flowing from USB interface to VCC.

In addition, the pulse signal outputted from the trigger signal generator 11 can be a positive or a negative pulse signal, and the number of the control signal outputted from the control signal generator is not limited. The numbers of the display, multuplexors and USB interfaces are also not limited.

The above embodiments are only used for description, and can not be treated as a limitation. The spirit and scope of the present invention will only be limited by the appended claims.

What is claimed is:

1. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the trigger signal generator comprises a resistor, a capacitor, and a switch, the resistor and the capacitor being serially connected between a power supply and a ground one end of the switch being connected to the ground, and the other end of the switch being connected to where the resistor and the capacitor are connected, such that when a user enables the switch, the switch will generate a pulse signal to be used as a trigger signal for outputting to the control signal generator;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal.

2. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the control signal generator comprises a D FLIP-FLOP having a clock signal input terminal to be used as the input of the control signal generator, and a reverse data output terminal to be connected with a data input terminal of the D FLIP-FLOP, a positive data output terminal of the D FLIP-FLOP being used as the output of the control signal generator.

3. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises a multiplexor, an input and an output of the multiplexor being connected respectively with each universal serial bus (USB) interface of different electronic devices, and a selecting signal input terminal thereof being connected with the output of the control signal generator.

4. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the control signal generator comprises at least two D FLIP-FLOPs, a clock signal input terminal of the first D FLIP-FLOP being connected with the output of the trigger signal generator, while a reverse data output terminal is connected with its data input terminal; a clock signal input terminal of the second D FLIP-FLOP being connected with the reverse data output terminal of the first D FLP-FLOP, while a reverse data output terminal of the second D FLIP-FLOP is connected with its data input terminal; and so on; and the positive data output terminals of all the D FLIP-FLOPs being used as the control signals for the connector.

5. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector.

6. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and a delay signal generator is provided between the trigger signal generator and the connector, having an input to be connected with the output of the trigger signal generator, and having an output to be connected with an enable terminal of the connector.

7. An electronic switching device for a universal serial bus (USB) interface according to claim 6, wherein the delay signal generator comprises two resistors, a capacitor and a diode, having its input to be connected with the output of the trigger signal generator, and having its output to be connected with the enable terminal of the connector, the first resistor and the capacitor being serially connected between a power supply and a ground, a point where the first resistor and the capacitor are connected being connected with a positive terminal of the diode and the enable terminal of the connector, while a negative terminal of the diode is connected with one end of the second resistor, and the other end of the second resistor being the input terminal of the delay signal generator.

8. An electronic switching device for a universal serial bus (USB) interface according to claim 1, wherein the control signal generator is connected with a display for showing the current connections of the universal serial bus (USB) interfaces.

9. An electronic switching device for a universal serial bus (USB) interface according to claim 8, wherein the display comprises light emitting diodes.

10. An electronic switching device for a universal serial bus (USB) interface, comprising a trigger signal generator, a control signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, the control signal generator is connected with an enable signal generator so that the connections between different USB interfaces are the same whenever the power supply begins conducting; and the enable signal generator comprises a resistor and a capacitor, the resistor and the capacitor being serially connected between the power supply and the ground, and a point where the resistor and the capacitor are connected being used as an output to be connected with a reset terminal of the control signal generator.

11. An electronic switching device for a universal serial bus (USB) interface according to claim 1, wherein the power supply used by the electronic switching device for a universal social bus (USB) interface is the power supply used by the connected universal serial bus (USB) interface.

12. An electronic switching device for a universal serial bus (USB) interface according to claim 1, wherein a diode is connected between the power supply and each USB interface to avoid the reverse current flowing from the connected universal serial bus (USB) interface to the power supply.

* * * * *

(12) INTER PARTES REEXAMINATION CERTIFICATE (560th)

United States Patent
Chen

(10) Number: US 6,564,275 C1
(45) Certificate Issued: Mar. 26, 2013

(54) ELECTRONIC SWITCHING DEVICE FOR A UNIVERSAL SERIAL BUS INTERFACE

(75) Inventor: Sun Chung Chen, Taipei (TW)

(73) Assignee: Aten Technology, Inc., Irvine, CA (US)

Reexamination Request:
No. 95/000,539, Mar. 8, 2010

Reexamination Certificate for:
Patent No.: 6,564,275
Issued: May 13, 2003
Appl. No.: 09/514,579
Filed: Feb. 28, 2000

(30) Foreign Application Priority Data

May 28, 1999 (TW) .................. 88208630 U

(51) Int. Cl.
*G06F 13/40* (2006.01)
(52) U.S. Cl.
USPC ............. 710/107; 710/20; 710/305; 710/313; 710/33; 710/36; 710/5; 710/51; 710/62; 710/63; 710/8

(58) Field of Classification Search .................. 710/10
See application file for complete search history.

(56) References Cited

To view the complete listing of prior art documents cited during the proceeding for Reexamination Control Number 95/000,539, please refer to the USPTO's public Patent Application Information Retrieval (PAIR) system under the Display References tab.

*Primary Examiner* — Woo H. Choi

(57) ABSTRACT

The present invention provides an electronic switching device for a universal serial bus (USB) interface, which can connect several different electronic devices each having a universal serial bus (USB) interface when needed. By manually enabling a switch of the electronic switching device for a universal serial bus (USB) interface, a trigger signal generated from a trigger signal generator will be outputted to a control signal generator to generate a control signal for connecting related electronic devices. A delay signal generator can be added to avoid the intermediate devices being operated unintentionally.

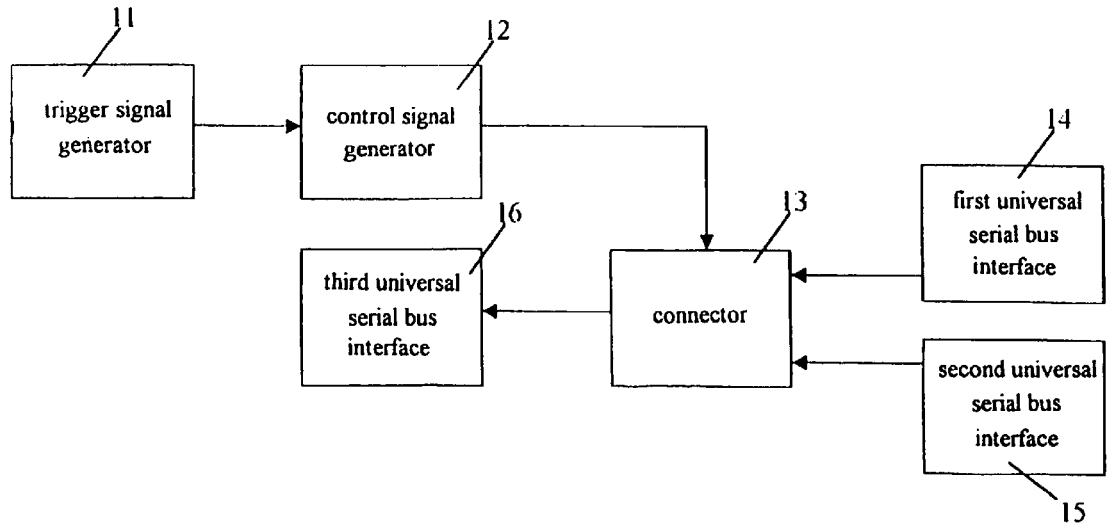

US 6,564,275 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 5 is confirmed.

Claims 1-4, 6 and 8-12 are cancelled.

New claims 13-47 are added and determined to be patentable.

Claim 7 was not reexamined.

*13. An electronic switching device for a universal serial bus (USB) interface according to claim 5, wherein the trigger signal generator comprises a resistor, a capacitor, and a switch, the resistor and the capacitor being serially connected between a power supply and a ground, one end of the switch being connected to the ground and the other end of the switch being connected to where the resistor and the capacitor are connected, such that when a user enables the switch, the switch will generate a pulse signal to be used as a trigger signal for outputting to the control signal generator.*

*14. An electronic switching device for a universal serial bus (USB) interface according to claim 5, wherein the control signal generator comprises a D FLIP-FLOP having a clock signal input terminal to be used as the input of the control signal generator and a reverse data output terminal to be connected with a data input terminal of the D FLIP-FLOP, a positive data output terminal of the D FLIP-FLOP being used as the output of the control signal generator.*

*15. An electronic switching device for a universal serial bus (USB) interface according to claim 5, wherein each of the multiplexors connected in parallel includes an input and an output being connected respectively with each universal serial bus (USB) interface of different electronic devices and a selecting signal input terminal being connected with the output of the control signal generator.*

*16. An electronic switching device for a universal serial bus (USB) interface according to claim 15, wherein each multiplexor comprises an integrated circuit having an enable terminal for connecting to a delay signal generator.*

*17. An electronic switching device for a universal serial bus (USB) interface according to claim 16, wherein the delay signal generator is configured such that when the switch is operated sequentially to connect related USB interfaces, a USB interface corresponding to an intervening switch position will not be enabled.*

*18. An electronic switching device for a universal serial bus (USB) interface according to claim 17, wherein the delay signal generator comprises at least a capacitor and a resistor, wherein the capacitor and the resistor are adapted to provide a time constant sufficient to cause delay in the delay signal generator.*

*19. An electronic switching device for a universal serial bus (USB) interface according to claim 5, wherein the control signal generator comprises at least two D FLIP-FLOPs, a clock signal input terminal of the first D FLIP-FLOP being connected with the output of the trigger signal generator, while a reverse data output terminal is connected with its data input terminal; a clock signal input terminal of the second D FLIP-FLOP being connected with the reverse data output terminal of the first D FLIP-FLOP, while a reverse data output terminal of the second D FLIP-FLOP is connected with its data input terminal; and the positive data output terminals of all the D FLIP-FLOPS being used as the control signals for the connector.*

*20. An electronic switching device for a universal serial bus (USB) interface according to claim 5, further comprising a delay signal generator connected between the trigger signal generator and the connector, having an input to be connected with the output of the trigger signal generator, and having an output to be connected with an enable terminal of the connector.*

*21. An electronic switching device for a universal serial bus (USB) interface according to claim 20, wherein the delay signal generator is configured such that when the switch is operated sequentially to connect related USB interfaces, a USB interface corresponding to an intervening switch position will not be enabled.*

*22. An electronic switching device for a universal serial bus (USB) interface according to claim 21, wherein the delay signal generator comprises a capacitor and a resistor, wherein the capacitor and the resistor are adapted to provide a time constant sufficient to cause delay in the delay signal generator.*

*23. An electronic switching device for a universal serial bus (USB) interface according to claim 5, wherein the control signal generator is connected with an enable signal generator using a reset terminal of the control signal generator so that the connections between different USB interfaces are the same whenever the power supply begins conducting.*

*24. An electronic switching device for a universal serial bus (USB) interface, comprising a trigger signal generator, a control signal generator, and a connector, wherein:*

*the trigger signal generator has an output to be connected with an input of the control signal generator, and a switch to output a trigger signal to the control signal generator when a user enables the switch;*

*the control signal generator has an input to be connected with an output of the trigger signal generator, and an output to be connected with an input of the connector, for receiving the trigger signal outputted from the trigger signal generator, processing the trigger signal, and then outputting a control signal to the connector; and*

*the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and*

*the connector comprises a multiplexor, an input and an output of the multiplexor being connected respectively with each universal serial bus (USB) interface of different electronic devices, and a selecting signal input terminal thereof being connected with the output of the control signal generator, wherein the multiplexor is an integrated circuit comprising an input pin as the selecting signal input terminal and an enable pin for connecting to a delay signal generator.*

*25. An electronic switching device for a universal serial bus (USB) interface according to claim 24, wherein the delay* signal generator is configured such that when the switch is operated sequentially to connect related USB interfaces, a USB interface corresponding to an intervening switch position will not be enabled.

26. An electronic switching device for a universal serial bus (USB) interface according to claim 24, wherein the delay signal generator comprises a capacitor and a resistor, wherein the capacitor and the resistor are adapted to provide a time constant sufficient to cause delay in the delay signal generator.

27. An electronic switching device for a universal serial bus (USB) interface according to claim 6, wherein the delay signal generator is configured such that when the switch is operated sequentially to connect related USB interfaces, a USB interface corresponding to an intervening switch position will not be enabled.

28. An electronic switching device for a universal serial bus (USB) interface according to claim 24, wherein the delay signal generator comprises a capacitor and a resistor, wherein the capacitor and the resistor are adapted to provide a time constant sufficient to cause delay in the delay signal generator.

29. An electronic switching device for a universal serial bus (USB) interface, comprising a trigger signal generator, a control signal generator, and a connector, wherein:
  the trigger signal generator has an output to be connected with an input of the control signal generator, and a switch to output a trigger signal to the control signal generator when a user enables the switch;
  the control signal generator has an input to be connected with an output of the trigger signal generator, and an output to be connected with an input of the connector, for receiving the trigger signal outputted from the trigger signal generator, processing the trigger signal, and then outputting a control signal to the connector; and
  the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and
  a delay signal generator is provided between the trigger signal generator and the connector, having an input to be connected with the output of the trigger signal generator, and having an output to be connected with an enable terminal of the connector, wherein the connector is an integrated circuit comprising an input pin as the enable terminal, a selecting signal input pin and an enable pin for connecting to the delay signal generator.

30. An electronic switching device for a universal serial bus (USB) interface according to claim 29, wherein the delay signal generator is configured such that when the switch is operated sequentially to connect related USB interfaces, a USB interface corresponding to an intervening switch position will not be enabled.

31. An electronic switching device for a universal serial bus (USB) interface according to claim 29, wherein the delay signal generator comprises a capacitor and a resistor, wherein the capacitor and the resistor are adapted to provide a time constant sufficient to cause delay in the delay signal generator.

32. An electronic switching device for a universal serial bus (USB) interface, comprising a trigger signal generator, a control signal generator, a delay signal generator, and a connector, wherein:
  the trigger signal generator has an output to be connected with an input of the control signal generator, and a switch to output a trigger signal to the control signal generator when a user enables the switch;
  the trigger signal generator comprises a resistor, a first capacitor, and a switch, the resistor and the first capacitor being serially connected between a power supply and a ground one end of the switch being connected to the ground, and the other end of the switch being connected to where the resistor and the first capacitor are connected, such that when a user enables the switch, the switch will generate a pulse signal to be used as a trigger signal for outputting to the control signal generator;
  the control signal generator has an input to be connected with an output of the trigger signal generator, and an output to be connected with an input of the connector, for receiving the trigger signal outputted from the trigger signal generator, processing the trigger signal, and then outputting a control signal to the connector;
  the delay signal generator has an input connected to the output of the trigger signal generator and an output connected to the connector, wherein the delay signal generator includes a second capacitor having a longer time constant than the first capacitor to delay connecting universal serial bus (USB) interfaces; and
  the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal.

33. An electronic switching device for a universal serial bus (USB) interface, comprising trigger signal generator, a control signal generator, a delay signal generator, and a connector, wherein:
  the trigger signal generator has an output to be connected with an input of the control signal generator, and a switch to output a trigger signal to the control signal generator when a user enables the switch;
  the trigger signal generator comprises a resistor, a first capacitor, and a switch, the resistor and the first capacitor being serially connected between a power supply and a ground one end of the switch being connected to the ground, and the other end of the switch being connected to where the resistor and the first capacitor are connected, such that when a user enables the switch, the switch will generate a pulse signal to be used as a trigger signal for outputting to the control signal generator;
  the control signal generator has an input to be connected with an output of the trigger signal generator, and an output to be connected with an input of the connector, for receiving the trigger signal outputted from the trigger signal generator, processing the trigger signal, and then outputting a control signal to the connector;
  the delay signal generator has an input connected to the output of the trigger signal generator and an output connected to the connector, wherein the delay signal generator includes a second capacitor having a longer time constant than the first capacitor to delay connecting universal serial bus (USB) interfaces; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises a multiplexor, an input and an output of the multiplexor being connected respectively with each universal serial bus (USB) interface of different electronic devices, and a selecting signal input terminal thereof being connected with the output of the control signal generator.

34. An electronic switching device for a universal serial bus (USB) interface, comprising a trigger signal generator, a control signal generator, a delay signal generator, and a connector, wherein:

the trigger signal generator has an output to be connected with an input of the control signal generator, and a switch to output a trigger signal to the control signal generator when a user enables the switch;

the trigger signal generator comprises a resistor, a first capacitor, and a switch, the resistor and the first capacitor being serially connected between a power supply and a ground one end of the switch being connected to the ground, and the other end of the switch being connected to where the resistor and the first capacitor are connected, such that when a user enables the switch, the switch will generate a pulse signal to be used as a trigger signal for outputting to the control signal generator;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the delay signal generator has an input connected to the output of the trigger signal generator and an output connected to the connector, wherein the delay signal generator includes a second capacitor having a longer time constant than the first capacitor to delay connecting universal serial bus (USB) interfaces; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector.

35. An electronic switching device for a universal serial bus (USB) interface, comprising a trigger signal generator, a control signal generator, a delay signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the delay signal generator has an input connected to the output of the trigger signal generator and an output connected to the connector, wherein the delay signal generator is adapted to delay connecting universal serial bus (USB) interfaces; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector, and the control signal generator comprises a D FLIP-FLOP having a clock signal input terminal to be used as the input of the control signal generator, and a reverse data output terminal to be connected with a data input terminal of the D FLIP-FLOP, a positive data output terminal of the D FLIP-FLOP being used as the output of the control signal generator.

36. An electronic switching device for a universal serial bus (USB) interface, comprising a trigger signal generator, a control signal generator, a delay signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the delay signal generator has an input connected to the output of the trigger signal generator and an output connected to the connector, wherein the delay signal generator is adapted to delay connecting universal serial bus (USB) interfaces; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector, and wherein each of the multiplexors connected in parallel includes an input and an output being connected respectively with each universal serial bus (USB) interface of different electronic devices and a selecting signal input terminal being connected with the output of the control signal generator.

37. An electronic switching device for a universal serial bus (USB) interface, comprising a trigger signal generator, a control signal generator, a delay signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the delay signal generator has an input connected to the output of the trigger signal generator and an output connected to the connector, wherein the delay signal generator is adapted to delay connecting universal serial bus (USB) interfaces; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector, and the control signal generator comprises at least two D FLIP-FLOPs, a clock signal input terminal of the first D FLIP-FLOP being connected with the output of the trigger signal generator, while a reverse data output terminal is connected with its data input terminal; a clock signal input terminal of the second D FLIP-FLOP being connected with the reverse data output terminal of the first D FLIP-FLOP, while a reverse data output terminal of the second D FLIP-FLOP is connected with its data input terminal; and the positive data output terminals of all the D FLIP-FLOPS being used as the control signals for the connector.

38. An electronic switching device for a universal serial bus (USB) interface, comprising a trigger signal generator, a control signal generator, a delay signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector; and the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector, and the delay signal generator is provided between the trigger signal generator and the connector, having an input to be connected with the output of the trigger signal generator, and having an output to be connected with an enable terminal of the connector, wherein the delay signal generator is adapted to delay connecting universal serial bus (USB) interfaces.

39. An electronic switching device for a universal serial bus (USB) interface, comprising a trigger signal generator, a control signal generator, an enable signal generator, a delay signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector;

the delay signal generator is provided between the trigger signal generator and the connector, having an input to be connected with the output of the trigger signal generator, and having an output to be connected with an enable terminal of the connector, wherein the delay signal generator is adapted to delay connecting universal serial bus (USB) interfaces; and the enable signal generator is connected with the control signal generator so that the connections between different USB interfaces are the same whenever the power supply begins conducting.

40. An electronic switching device for a universal serial bus (USB) interface, comprising a trigger signal generator, a control signal generator, an enable signal generator, a delay signal generator, and a connector, wherein:

the trigger signal generator has an output to be connected with an input of the control signal generator, and a switch to output a trigger signal to the control signal generator when a user enables the switch;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector;

the delay signal generator is provided between the trigger signal generator and the connector, having an input to be connected with the output of the trigger signal generator, and having an output to be connected with an enable terminal of the connector, wherein the delay signal generator is adapted to delay connecting universal serial bus (USB) interfaces; and the enable signal generator is connected with the control signal generator so that the connections between different USB interfaces are the same whenever the power supply begins conducting, and the enable signal generator comprises a resistor and a capacitor, the resistor and the capacitor being serially connected between the power supply and the ground, and a point where the resistor and the capacitor are connected being used as an output to be connected with a reset terminal of the control signal generator.

41. An electronic switching device for a universal serial bus (USB) interface, comprising a trigger signal generator, a control signal generator, an enable signal generator, a delay signal generator, and a connector, wherein:

the trigger signal generator has an output to be connected with an input of the control signal generator, and a switch to output a trigger signal to the control signal generator when a user enables the switch;

the trigger signal generator comprises a resistor, a first capacitor, and a switch, the resistor and the first capacitor being serially connected between a power supply and a ground one end of the switch being connected to the ground, and the other end of the switch being connected to where the resistor and the first capacitor are connected, such that when a user enables the switch, the switch will generate a pulse signal to be used as a trigger signal for outputting to the control signal generator;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the delay signal generator has an input connected to the output of the trigger signal generator and an output connected to the connector, wherein the delay signal generator includes a second capacitor having a longer time constant than the first capacitor to delay connecting universal serial bus (USB) interfaces;

the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector; and the enable signal generator is connected with the control signal generator so that the connections between different USB interfaces are the same whenever the power supply begins conducting.

42. An electronic switching device for a universal serial bus (USB) interface, comprising a trigger signal generator, a control signal generator, an enable signal generator, a delay signal generator, and a connector, wherein:

the trigger signal generator has an output to be connected with an input of the control signal generator, and a switch to output a trigger signal to the control signal generator when a user enables the switch;

the trigger signal generator comprises a first resistor, a first capacitor, and a switch, the first resistor and the first capacitor being serially connected between a power supply and a ground one end of the switch being connected to the ground, and the other end of the switch being connected to where the first resistor and the first capacitor are connected, such that when a user enables the switch, the switch will generate a pulse signal to be used as a trigger signal for outputting to the control signal generator;

the control signal generator has an input to be connected with an output of the trigger signal generator, and an output to be connected with an input of the connector, for receiving the trigger signal outputted from the trigger signal generator, processing the trigger signal, and then outputting a control signal to the connector;

the delay signal generator has an input connected to the output of the trigger signal generator and an output connected to the connector, wherein the delay signal generator includes a second capacitor having a longer time constant than the first capacitor to delay connecting universal serial bus (USB) interfaces;

the connector has an input to be connected with each universal serial bus (USB) interface of at least two electronic devices, and an output to be connected with a universal serial bus (USB) interface of another electronic device, such that when the connector receives the control signal outputted from the control signal generator, the connector will connect related universal serial bus (USB) interfaces according to the control signal, and the connector comprises at least two identical multiplexors to be parallelly connected for decreasing the internal resistance in the connector; and the enable signal generator is connected with the control signal generator so that the connections between different USB interfaces are the same whenever the power supply begins conducting, and the enable signal generator comprises a second resistor and a third capacitor, the second resistor and the third capacitor being serially connected between the power supply and the ground, and a point where the second resistor and the third capacitor are connected being used as an output to be connected with a reset terminal of the control signal generator.

43. An electronic switching device for a universal serial bus (USB) interface according to claim 1, wherein the input of the control signal generator consists of the connection to the output of the trigger signal generator for receiving only the trigger signal outputted from the trigger signal generator enabled by the user.

44. An electronic switching device for a universal serial bus (USB) interface according to claim 2, wherein the input of the control signal generator consists of the connection to the output of the trigger signal generator for receiving only the trigger signal outputted from the trigger signal generator enabled by the user.

45. An electronic switching device for a universal serial bus (USB) interface according to claim 3, wherein the input of the control signal generator consists of the connection to the output of the trigger signal generator for receiving only the trigger signal outputted from the trigger signal generator enabled by the user.

46. An electronic switching device for a universal serial bus (USB) interface according to claim 4, wherein the input of the control signal generator consists of the connection to the output of the trigger signal generator for receiving only the trigger signal outputted from the trigger signal generator enabled by the user.

47. An electronic switching device for a universal serial bus (USB) interface according to claim 10, wherein the input of the control signal generator consists of the connection to the output of the trigger signal generator for receiving only the trigger signal outputted from the trigger signal generator enabled by the user.

\* \* \* \* \*